United States Patent
Sakashita et al.

(10) Patent No.: US 10,956,763 B2
(45) Date of Patent: Mar. 23, 2021

(54) INFORMATION TERMINAL DEVICE

(71) Applicant: KYOCERA Document Solutions Inc., Osaka (JP)

(72) Inventors: Fumiya Sakashita, Osaka (JP); Yoichi Hiranuma, Osaka (JP); Shoichi Sakaguchi, Osaka (JP); Shohei Fujiwara, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 206 days.

(21) Appl. No.: 16/238,048

(22) Filed: Jan. 2, 2019

(65) Prior Publication Data

US 2019/0220681 A1 Jul. 18, 2019

(30) Foreign Application Priority Data

Jan. 12, 2018 (JP) .............................. JP2018-003801

(51) Int. Cl.
| | | |
|---|---|---|
| *G06F 3/0484* | (2013.01) | |
| *G06F 3/0486* | (2013.01) | |
| *G06F 3/0488* | (2013.01) | |
| *G06K 9/00* | (2006.01) | |
| *G06K 9/20* | (2006.01) | |
| *H04N 1/00* | (2006.01) | |

(52) U.S. Cl.
CPC ....... *G06K 9/2054* (2013.01); *G06K 9/00442* (2013.01); *H04N 1/00074* (2013.01); *H04N 1/00411* (2013.01); *H04N 1/00413* (2013.01); *H04N 1/00464* (2013.01)

(58) Field of Classification Search
None
See application file for complete search history.

(56) References Cited

U.S. PATENT DOCUMENTS

| | | | | |
|---|---|---|---|---|
| 2009/0244608 A1* | 10/2009 | Tsuji | ................... | G06K 9/00228 358/1.15 |
| 2010/0066822 A1* | 3/2010 | Steinberg | ........... | G06K 9/00208 348/77 |

(Continued)

FOREIGN PATENT DOCUMENTS

JP 2014-006914 A 1/2014

*Primary Examiner* — Soo Shin
(74) *Attorney, Agent, or Firm* — IP Business Solutions, LLC (57) ABSTRACT

An information terminal device including: a display section; an operation section receiving enlargement operation of enlarging one of a plurality of divided regions displayed on a display screen of the display section; a remaining region specification section specifying a remaining region on the display screen excluding the one divided region enlarged through the enlargement operation; an arrangement region determination section determining an arrangement region for arranging all the divided regions other than the one enlarged divided region in the remaining region; a reduced arrangement section arranging each of the other divided regions on a reduced scale in the arrangement region; and a display control section displaying, on an enlarged scale, an image of the one enlarged divided region and displaying, on an enlarged scale within the other divided regions arranged on a reduced scale by the reduced arrangement section, an image of a specific portion of the other divided regions.

4 Claims, 9 Drawing Sheets

(56) References Cited

U.S. PATENT DOCUMENTS

| | | | |
|---|---|---|---|
| 2010/0321533 A1* | 12/2010 | Park | H04N 5/232935 348/239 |
| 2013/0147731 A1* | 6/2013 | Adachi | G06F 3/04845 345/173 |
| 2015/0264253 A1* | 9/2015 | Takagi | G06F 3/04845 348/333.11 |
| 2015/0317026 A1* | 11/2015 | Choi | G06F 9/44 345/660 |

* cited by examiner

INFORMATION TERMINAL DEVICE

INCORPORATION BY REFERENCE

This application claims priority to Japanese Patent Application No. 2018-003801 filed on Jan. 12, 2018, the entire contents of which are incorporated by reference herein.

BACKGROUND

This disclosure relates to an information terminal device, an information processing system, and a computer-readable non-transitory recording medium storing a display control program, and more specifically to a technology for switching a plurality of divided displays on a display screen.

In recent years, there has appeared an information processing system capable of viewing, on a web browser of a personal computer, respective monitored images photographed by a plurality of monitoring cameras. The web browser is application software for viewing a web page. Application software for receiving provision of a service of viewing a monitored image by an application server is one example.

A typical image processing system includes: a plurality of (for example, four) monitoring cameras; an application server providing a service of viewing a monitored image; and a portable terminal into which a web browser provided by the application server is installed. In a case where a request for viewing has been provided to the application server from the portable terminal, screen information which permits the monitored images photographed with the four monitoring cameras to be displayed on the web browser is provided, and the monitored images of the four monitoring cameras can be displayed on a display screen of the portable terminal. This portable terminal is capable of four-screen display including one main screen with a large display region and three sub-screens with a small display region vertically arranged on a right side of the main screen. Then upon detection of operation of sliding the main screen touched by a user's finger towards the sub-screen on a touch panel provided on the display screen (that is, operation of enlarging the main screen), the main screen is displayed on an enlarged scale on the entire display screen.

SUMMARY

As one aspect of this disclosure, a technology obtained by further improving the technology described above will be suggested.

An information terminal device according to one aspect of this disclosure includes: a display section, an operation section, a remaining region specification section, an arrangement region determination section, a reduced arrangement section, and a display control section. The display section displays an image in each of a plurality of divided regions obtained by plurally dividing a display screen. The operation section receives, from a user, enlargement operation of enlarging one of the plurality of divided regions on the display screen. The remaining region specification section specifies a remaining region on the display screen excluding the one divided region enlarged through the enlargement operation of the operation section by the user. The arrangement region determination section determines an arrangement region for arranging all the divided regions other than the one enlarged divided region in the remaining region specified by the remaining region specification section. The reduced arrangement section arranges each of the other divided regions on a reduced scale in the arrangement region determined by the arrangement region determination section. The display control section displays, on an enlarged scale, an image of the one enlarged divided region, in the one enlarged divided region, and also displays, on an enlarged scale within the other divided regions arranged on a reduced scale by the reduced arrangement section, an image of a specific portion of the other divided regions.

Another aspect of this disclosure refers to an information processing system in which an information terminal device capable of displaying a plurality of images distributed via a network is communicable with an application server. The information terminal device includes: a request section, a display section, an operation section, a remaining region specification section, an arrangement region determination section, a reduced arrangement section, a notification section, an acquisition section, and a display control section. The application server includes a transmission section. The request section provides distribution sources of the plurality of images with a request for the plurality of images. The display section displays, in each of a plurality of divided regions obtained by plurally dividing a display screen, the plurality of images requested by the request section. The operation section receives, from a user, enlargement operation of enlarging one of the plurality of divided regions on the display screen. The remaining region specification section specifies a remaining region on the display screen excluding the one divided region enlarged through the enlargement operation of the operation section by the user. The arrangement region determination section determines an arrangement region for arranging all the divided regions other than the one enlarged divided region in the remaining region specified by the remaining region specification section. The reduced arrangement section arranges each of the other divided regions on a reduced scale in the arrangement region determined by the arrangement region determination section. The notification section outputs, to the application server, notification related to the one divided region enlarged through the enlargement operation of the operation section by the user and related to the other divided regions arranged on a reduced scale in the arrangement region by the reduced arrangement section. The acquisition section acquires screen information transmitted by the transmission section of the application server. The display control section uses the screen information acquired by the acquisition section to display an image of the one enlarged divided region on an enlarged scale in the one divided region and also to display, on an enlarged scale within the other divided regions arranged on a reduced scale by the reduced arrangement section, an image of a specific portion of the other divided regions. The transmission section of the application server transmits screen information of the one enlarged divided region and the other reduced divided regions on the display screen in the information terminal device in accordance with the notification provided from the notification section.

In a computer-readable non-transitory recording medium storing a display control program according to another aspect of this disclosure, the display control program causes a computer including a processor to, through execution of the display control program by the processor, function as: a remaining region specification section, an arrangement region determination section, a reduced arrangement section, and a display control section. The remaining region specification section specifies a remaining region on a display screen excluding one of a plurality of divided regions on the display screen, the one divided region being enlarged through enlargement operation of an operation section by a user. The arrangement region determination section determines an arrangement region for arranging all the divided regions other than the one enlarged divided region in the remaining region specified by the remaining region specification section. The reduced arrangement section arranges each of the other divided regions on a reduced scale in the arrangement region determined by the arrangement region determination section. The display control section displays, on an enlarged scale, an image of the one enlarged divided region, in the one enlarged divided region, and also displays, on an enlarged scale within the other divided regions arranged on a reduced scale by the reduced arrangement section, an image of a specific portion of the other divided regions.

DETAILED DESCRIPTION

Hereinafter, an information terminal device and an information processing system according to an embodiment of this disclosure will be described in detail with reference to the drawings.

Figure 1:
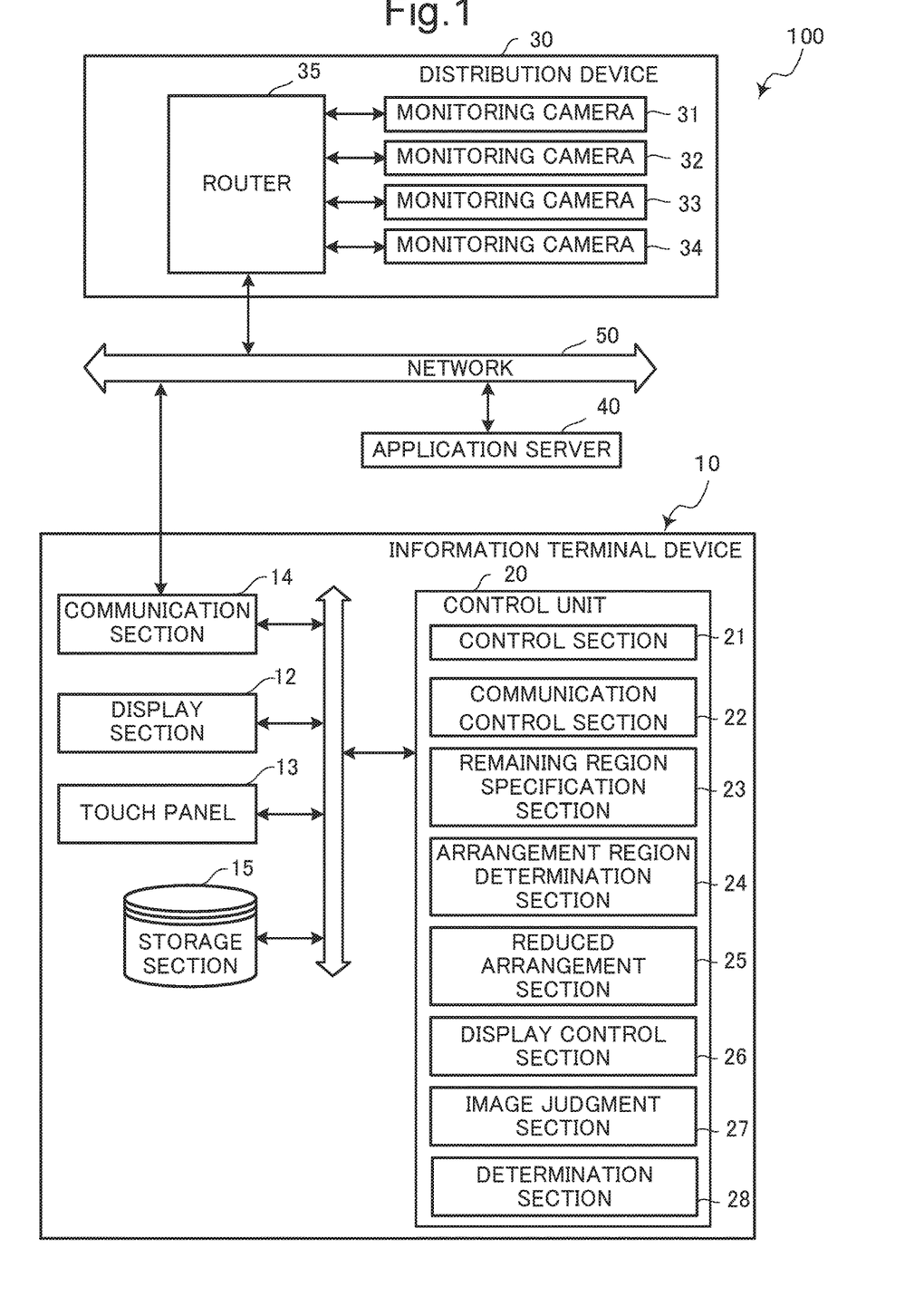
FIG. 1 is a block diagram illustrating configuration of an information terminal device and an information processing system according to one embodiment of this disclosure.

FIG. 1 is a block diagram illustrating configuration of the information terminal device and the information processing system of this disclosure. The information processing system 100 of this embodiment makes it possible to view, on a web browser of the information terminal device 10 such as a tablet computer, each of monitored images photographed with a plurality of monitoring cameras 31 to 34 of a distribution device 30.

The information processing system 100 includes: the information terminal device 10, the distribution device 30, an application server 40, and a network 50. The information terminal device 10, the distribution device 30, and the application server 40 are connected together in a manner such as to be communicable with each other via the network 50.

The distribution device 30 includes: the plurality of (four in this embodiment) monitoring cameras 31 to 34; and a router 35 which is communicable with the information terminal device 10 and the application server 40. The router 35 is connected to the monitoring cameras 31 to 34. Note that each of the monitoring cameras 31 to 34 is a device which photographs a static image and a moving image (they are collectively referred to as images), and the moving image is also referred to as a video. Alternatively, a plurality of images can be provided by one monitoring camera.

The application server 40 is a web application server which manages IP addresses of the four monitoring cameras 31 to 34 connected to the router 35 and which provides screen information permitting image display on the browser in a case where the information terminal device 10 has provided a request for viewing each of the images photographed by these monitoring cameras 31 to 34.

The information terminal device 10 is a portable terminal device such as a tablet computer, and includes: a display section 12, a touch panel 13, a communication section 14, a storage section 15, and a control unit 20. These components are capable of data or signal transmission and reception to and from each other via a bus. The information terminal device 10 has a browser installed therein for receiving services provided by the application server 40. Note that the information terminal device 10 may be a portable terminal device such as a smartphone or a disk-top personal computer.

The display section 12 is formed of, for example, a liquid crystal display (LCD) or an organic EL (organic light-emitting diode (OLED)).

The touch panel 13 is of, for example, a so-called resistive film type or a capacitance type. The touch panel 13 is arranged on a screen of the display section 12 and detects contact of a finger or the like on the screen of the display section 12 together with a position of this contact. Upon the contact of the finger or the like, the touch panel 13 outputs a detection signal indicating coordinates of the position of the aforementioned contact to a control section 21 of the control unit 20. Therefore, the touch panel 13 plays a role as an operation section to which user operation performed on the screen of the display section 12 is inputted.

Moreover, the information terminal device 10 may include, as an operation section to which the user operation is inputted, hard keys in addition to the aforementioned touch panel 13.

The communication section 14 is a communication interface which includes a communication module such as a wireless LAN chip, not illustrated. The communication section 14 has a function of making communication between the distribution device 30 and the application server 40.

The storage section 15 is composed of: a large-capacity solid state drive (SSD), a hard disk drive (HDD), etc., and stores various pieces of data and programs.

The control unit 20 is composed of a processor, a random-access memory (RAM), a read only memory (ROM), and the like. The processor is, for example, a central processing unit (CPU), an MPU, or an ASIC. As a result of execution of a control program stored in the aforementioned ROM or storage section 15 by the aforementioned processor, this control unit 20 functions as the control section 21, a communication control section 22, a remaining region specification section 23, an arrangement region determination section 24, a reduced arrangement section 25, a display control section 26, an image judgment section 27, and a determination section 28. Note that the aforementioned components may each be formed by a hardware circuit without depending on operation performed based on the aforementioned control program.

The control section 21 is in charge of overall operation control of the information terminal device 10. The control section 21 is also connected to the display section 12, the touch panel 13, the communication section 14, the storage section 15, etc., and performs operation control of each of the aforementioned components and signal or data transmission and reception to and from each component. The control section 21 controls display operation of the display section 12 in particular. The communication control section 22 has a function of controlling communication operation of the communication section 14.

Figure 4:
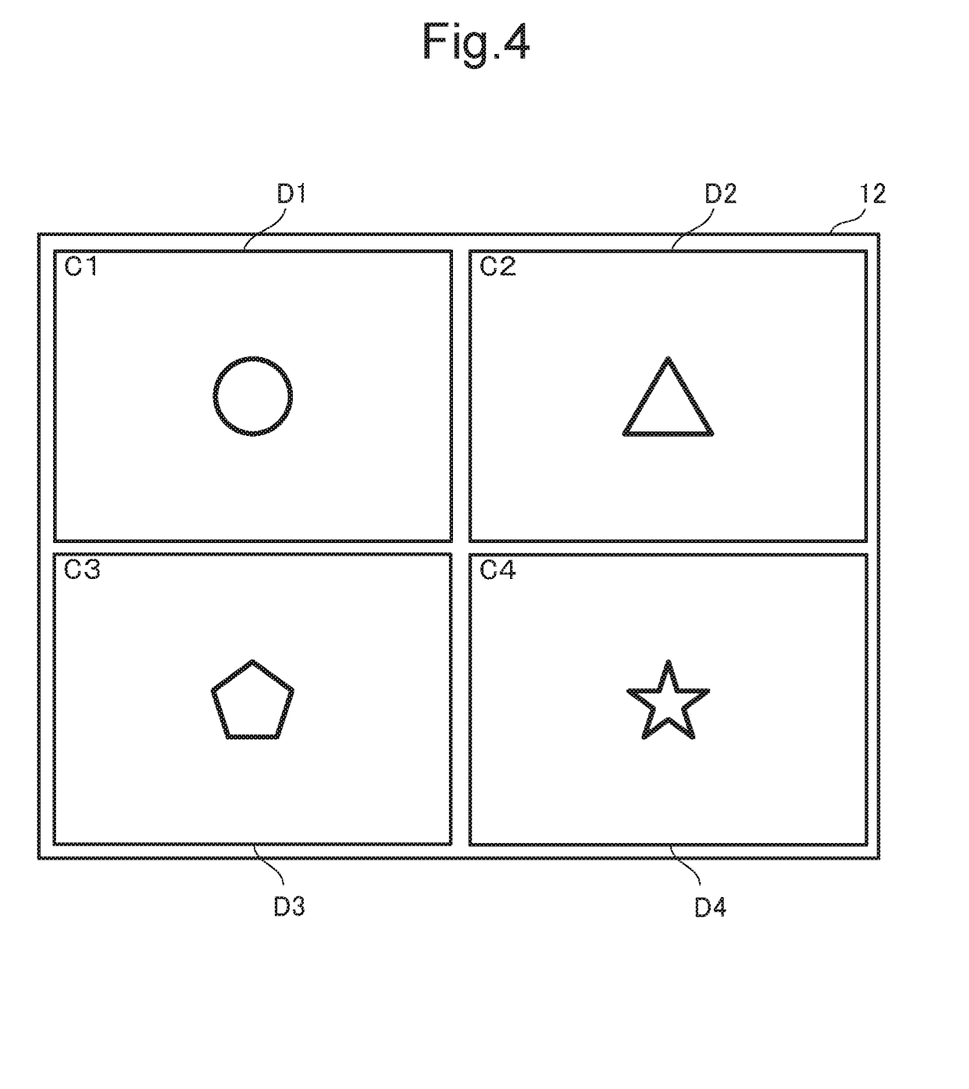
FIG. 4 is a diagram illustrating one example in which respective images of four monitoring cameras are displayed in the four divided regions of the display screen of the information terminal device.
Figure 5:
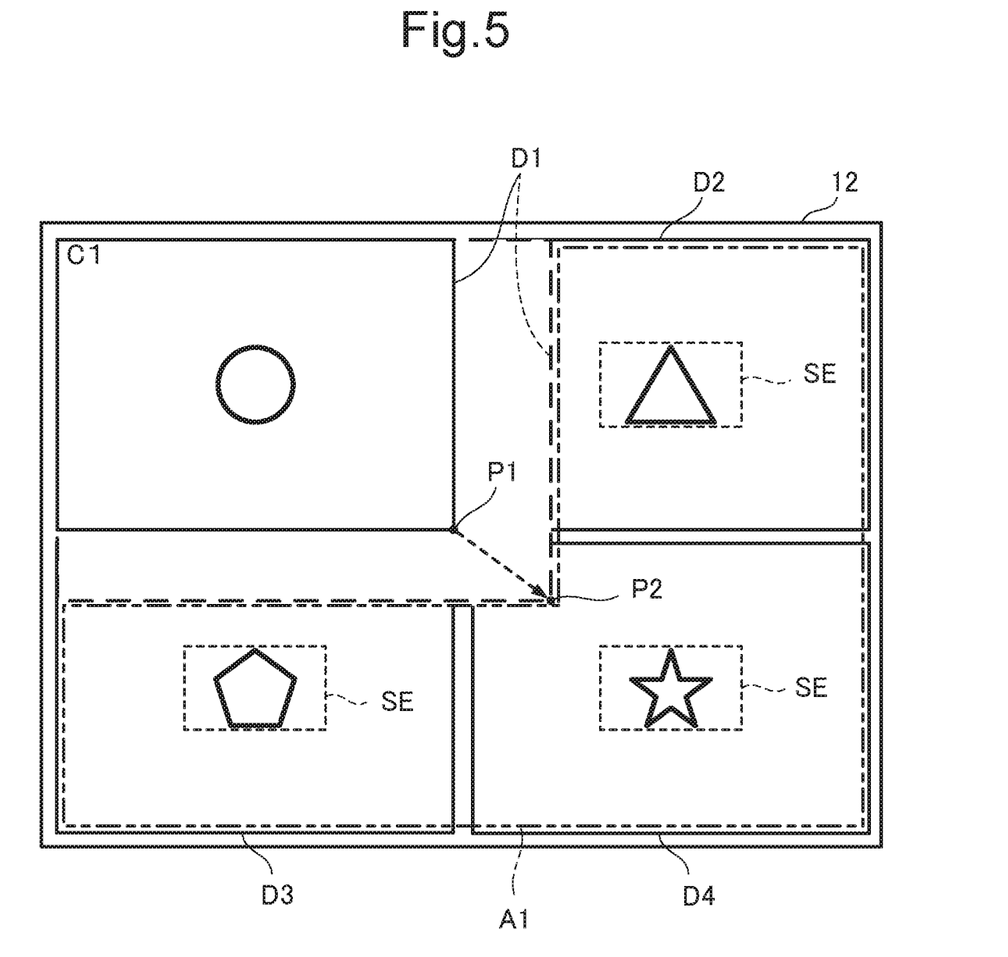
FIG. 5 is a diagram illustrating that the divided region located at a left top of the display screen illustrated in FIG. 4 is subjected to enlargement operation.

The display control section 26 performs control in a manner such that a display screen of the display section 12 provides, for example, four-screen display, as illustrated in FIG. 4 to be described later on. More specifically, the display control section 26 performs control in a manner such that the monitored images respectively photographed with the four monitoring cameras 31 to 34 are respectively displayed in four divided regions D1 to D4 which are obtained by equally and quarterly dividing the display screen of the display section 12 to a left top, a right top, a left bottom, and a right bottom. Moreover, as illustrated in FIG. 4, the display control section 26 causes display of "C1" to "C4" at respective left top corner parts of the divided regions D1 to D4, indicating that they are the images respectively photographed by the monitoring cameras 31 to 34. In FIG. 4, the monitored images of the monitoring cameras 31 to 34 are illustrated in a circular shape, a triangular shape, a pentagonal shape, and a star shape, respectively. In this embodiment, as illustrated in FIG. 5 to be described later on, a subject (for example, illustrated in the circular shape) included in the divided region D1 subjected to enlargement operation is specified as a subject to be monitored and the triangular shape, the pentagonal shape, and the star shape respectively illustrated in the other divided regions D2 to D4 are excluded from a monitoring target.

Moreover, based on the detection signal outputted from the touch panel 13, the control section 21 specifies user operation inputted by a user. Then the control section 21 performs control in accordance with the specified user operation.

The aforementioned user operation is, for example, touch operation, drag operation, or swipe operation. For example, upon separation of user's finger immediately after contact of his or her finger on the touch panel 13, the touch panel 13 outputs, to the control section 21, a detection signal indicating a position where the contact has been detected. Upon input of the detection signal, the control section 21 detects, based on this detection signal, that the user operation is touch operation. This touch operation is performed on, for example, a soft key on the screen of the display section 12.

Moreover, upon slow movement of the user's finger directly after maintaining a state in which the finger is in contact with the touch panel 13 (that is, after long pressing), the touch panel 13 outputs, to the control section 21, a detection signal indicating each moving position from an initial position where first contact has been detected to a final position where final contact has been detected after maintaining the initial position for predefined time (for example, 0.5 seconds). Upon input of the detection signal, the control section 21 detects, based on this detection signal, that the user operation is drag operation as well as an operation direction of the drag operation and the final position. In this embodiment, the drag operation includes, for example, enlargement operation performed on a corner part of the one divided region on the display of the display section 12 upon enlargement of the aforementioned one divided region. More specifically, as illustrated in FIG. 5, through slow movement of the user's finger to the final position P2 directly after maintaining, for the predefined time or longer, the state in which the user's finger is in contact with a position (that is, the initial position P1) located at a right bottom corner part of the one divided region D1 (for example, the divided region D1 before subjected to the enlargement operation) on the display screen of the display section 12, the touch panel 13 outputs, to the control section 21, the detection signal indicating each moving position from the initial position P1 to the final position P2 after maintaining the initial position P1 for the predefined time. Upon input of this detection signal, the control section 21 detects, based on the detection signal, that the user operation is drag operation (enlargement operation), the operation direction of the drag operation, and the final position P2. In this embodiment, the drag operation (enlargement operation) is defined as enlargement operation of maintaining an aspect ratio of the divided region D1 (the same applies to a case where any one of the divided regions D2 to D4 is enlarged) but may be enlargement operation with which the aspect ratio is not maintained.

Moreover, as a result of the user's immediate finger movement in the state in which the finger is in contact with the touch panel 13, the touch panel 13 outputs, to the control section 21, the detection signal indicating each moving position from the initial position where the initial contact has been detected to the final position where the final contact has been detected. Upon input of this detection signal, the control section 21 detects, based on the detection signal, that the user operation is swipe operation and an operation direction of the swipe operation. This swipe operation is performed, for example, on an icon on the screen of the display section 12 upon moving the icon.

As illustrated in FIG. 5, the remaining region specification section 23 specifies a remaining region A1 on the display screen of the display section 12 excluding the one divided region D1 enlarged through the enlargement operation (drag operation) of the touch panel 13 by the user. Through the aforementioned drag operation (enlargement operation), the movement of the right bottom corner part of the divided region D1 to the final position P2 is detected by the control section 21, and the remaining region specification section 23 specifies the remaining region A1 on the display screen of the display section 12 excluding the enlarged divided region D1 whose right bottom corner part has moved to the final position P2.

Figure 6:
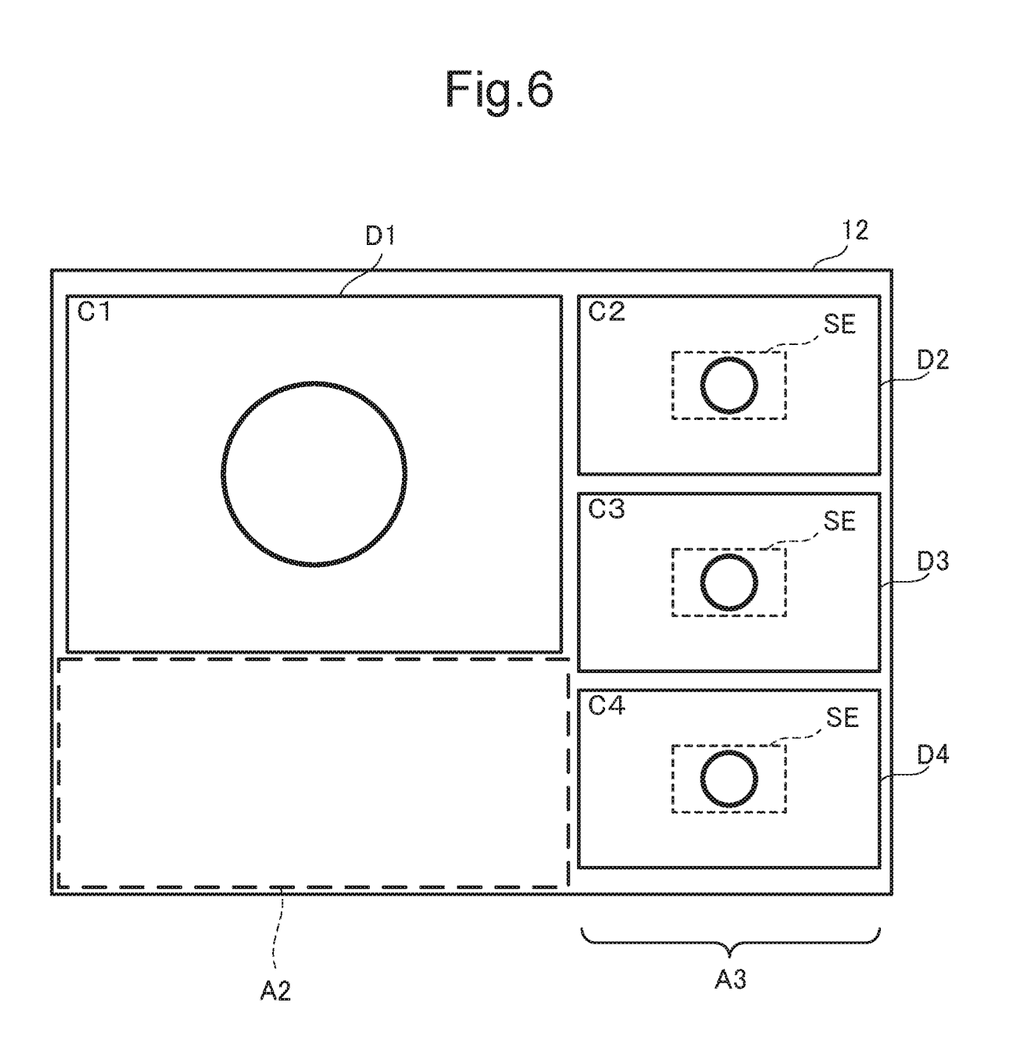
FIG. 6 is a diagram illustrating the other divided regions vertically rearranged at a right following the enlargement operation performed on the left top divided region illustrated in FIG. 5.

As illustrated in FIG. 6, the arrangement region determination section 24 determines, in the remaining region A1 specified by the remaining region specification section 23, an arrangement region A3 for arranging all the other divided regions D2 to D4 other than the one enlarged divided region D1. For example, the arrangement region determination section 24 determines, as the arrangement region A3, a region portion of the display screen located at a right of the enlarged divided region D1 whose right bottom corner part has moved to the final position P2.

As illustrated in FIG. 6, the reduced arrangement section 25 arranges each of the other divided regions D2 to D4 on a reduced scale in the arrangement region A3 determined by the arrangement region determination section 24. Note that the reduced arrangement section 25 reduces the divided regions D2 to D4 so as to maintain the aspect ratio in this embodiment (the same applies to a case where reduction including the divided region D1 is performed) but the reduced arrangement section 25 may perform reduction with which the aspect ratio is not maintained.

The image judgment section 27 execute image recognition processing (for example, known face recognition processing or human recognition processing) on the images displayed in the other divided regions (the divided regions D2 to D4 of FIG. 6) to thereby judge whether or not a subject or an object is included in the aforementioned images. In this embodiment, the image judgment section 27 performs image recognition on the image displayed in the divided region D1 subjected to the enlargement operation as illustrated in FIG. 5, and specifies, as a subjected to be monitored, the subject (for example, illustrated in a circle) included in the image of the divided region D1. More specifically, the image judgment section 27 executes known face authentication processing to thereby extract, based on image information displayed in the enlarged divided region D1, face authentication information of the subject (for example, information indicating feature points of the face, such as eyes, nose, and mouse, in a face region determined from the image of the subject). Then the image judgment section 27 stores the extracted face authentication information of the subject as collation source registration data into the storage section 15. Next, the image judgment section 27 judges, for each of the divided regions D2 to D4, whether or not the subject to be monitored (for example, illustrated in the circle) is included in the images displayed in the other divided regions (the divided regions D2 to D4 of FIG. 6). More specifically, the image judgment section 27 executes the known face authentication processing to thereby judge whether or not the face authentication information of the subject extracted based on the image information of each of the divided regions D2 to D4 matches the collation source registration data of the storage section 15, and in a case where the aforementioned face authentication information matches the data, the image judgment section 27 judges that the subject to be monitored is included in the images of the divided regions D2 to D4. Note that it is illustrated that the subject to be monitored (for example, illustrated in the circle) is included in the images of the divided regions D2 to D4 of FIG. 6.

Figure 7:
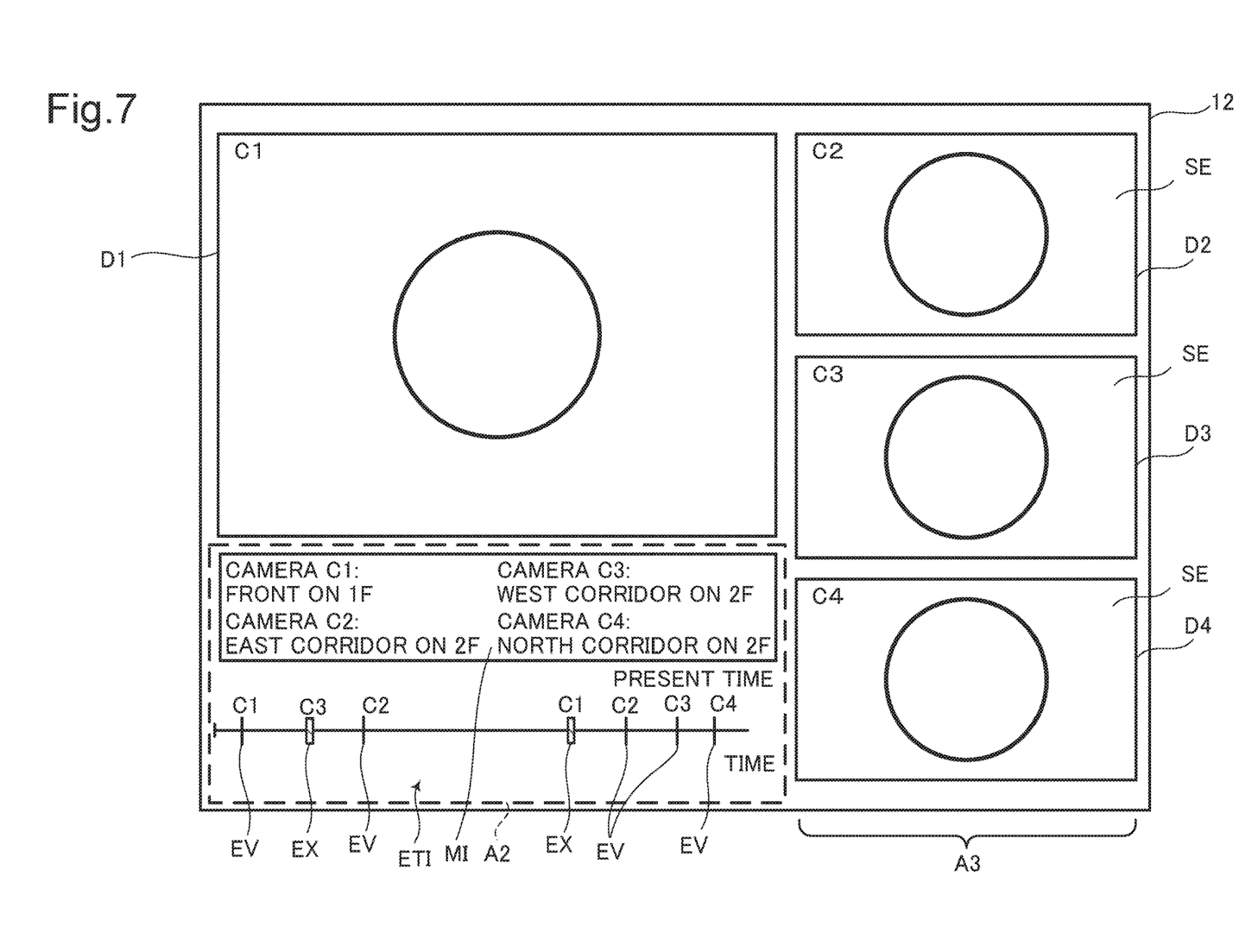
FIG. 7 is a diagram illustrating enlarged display of images of the divided regions vertically arranged at the right together with a type display image and an event occurrence table image displayed in an empty region.

Moreover, as illustrated in FIG. 7, the display control section 26 displays, on an enlarged scale in the one enlarged divided region D1, the image of the one divided region D1, and in a case where the subject to be monitored (for example, illustrated in the circle) has been displayed in the divided regions D2 to D4 arranged on a reduced scale by the reduced arrangement section 25 (that is, in a case where the image judgment section 27 has judged that the subject is included in the images of the other divided regions D2 to D4), the display control section 26 displays an image of a specific portion SE including the subject to be monitored (for example, illustrated in the circle) on an enlarged scale within the other divided regions D2 to D4.

More specifically, upon judgment by the image judgment section 27 that the subject is included in the image of the other divided region D2 arranged on a reduced scale by the reduced arrangement section 25, the display control section 26 displays, on an enlarged scale in the divided region D2 as illustrated in FIG. 7, the image of the specific portion SE (that is, the image of the subject) as one portion of the image of the other divided region D2 as illustrated in FIG. 6. Moreover, upon judgment that the subject is included in each of the images of the other divided regions D3 and D4, the specific portions SE (that is, the subjects) of the other divided regions D3 and D4 are each displayed on an enlarged scale. As a result, even though the divided regions D2 to D4 have been reduced, the specific portion SE (that is, the subject) of the divided regions D2 to D4 is displayed on an enlarged scale, thus permitting more visible display of the specific portions SE of the divided regions D2 to D4.

Note that upon judgment by the image judgment section 27 that the subject is included in the images of the other divided regions D2 to D4, the display control section 26 may display, as the specific portion SE on an enlarged scale in the other divided regions D2 to D4, a portion (for example, a rectangular region portion including the face of the subject) including the face of the subject subjected to the face recognition performed by the image judgment section 27. In this case, the specific portions SE (that is, the face as a feature portion of the subject) of the divided regions D2 to D4 are displayed on an enlarged scale even though the divided regions D2 to D4 have been reduced, thus permitting even more visible display of the specific portions SE of the divided regions D2 to D4.

In this embodiment, a monitoring target is the subject to be monitored (for example, illustrated in the circle) as illustrated in FIG. 5, but a predefined subject (for example, an extinguisher) may be provided as the monitoring target. In this case, the image judgment section 27 can execute, for example, known pattern matching image processing to thereby judge whether or not the aforementioned subject (for example, the extinguisher) is included in the images of the divided regions D1 to D4. Upon judgment by the image judgment section 27 that the aforementioned subject (for example, the extinguisher) is included in the images of the other divided regions D2 to D4, the display control section 26 displays, as the specific portions SE on an enlarged scale in the other divided regions D2 to D4, a portion (for example, a rectangular region portion including all or part of the extinguisher) including the subject (for example, the extinguisher) recognized by the image judgment section 27. As a result, even though the divided regions D2 to D4 have been reduced, the specific portion SE (that is, the subject) of the divided regions D2 to D4 are displayed on an enlarged scale, thus permitting more visible display of the specific portion SE (that is, the subject) of the divided regions D2 to D4.

The determination section 28 determines, based on the remaining region A1 (see FIG. 5) specified by the remaining region specification section 23, whether or not a ratio of an empty region A2 (see FIG. 6), excluding the arrangement region A3 determined by the arrangement region determination section 24, occupying the display screen is equal to or greater than a predefined specific ratio (for example, 10%) or more. Upon determination by the determination section 28 that the aforementioned ratio is equal to or greater than the specific ratio (for example, 10%), the display control section 26 displays, in the empty region A2, a type display image MI indicating types (for example, information indicating photographing places) of the images of the plurality of divided regions and an event occurrence table image ETI indicating timing of occurrence of an event EV with respect to a photographing time axis extending in a horizontal direction, as illustrated in FIG. 7.

As illustrated in FIG. 7, the type display image MI is an images which indicates the photographing places such that the images in the divided regions D1 to D4 are respectively photographed with the monitoring camera 31 (camera C1) located at a front on a first floor, the monitoring camera 32 (camera C2) located at an east corridor on a second floor, the monitoring camera 33 (camera C3) located at a west corridor on the second floor, and the monitoring camera 34 (camera C4) located at a north corridor on the second floor.

The event occurrence table image ETI is an image indicating at which of the photographing times the event EV, for example, appearance of the subject to be monitored (for example, illustrated in the circle) has occurred. The event occurrence table image ETI of this embodiment has a photographing time axis with a left end of this photographing time axis indicating a midnight of a corresponding day and a right end of the photographing time axis indicating current time of the same day. More specifically, upon judgment by the image judgment section 27 that the subject to be monitored is included in the images of the divided regions D1 to D4, the display control section 26 displays the event EV at a portion of the event occurrence table image ETI corresponding to a time point at which the aforementioned judgment has been made. As illustrated in FIG. 7, the user can view each event EV of the event occurrence table image ETI displayed in the empty region A2 of the display section 12 to thereby recognize that the event EV has occurred.

Moreover, upon the enlargement operation of enlarging the one divided region, an enlargement operation mark EX indicating that the one divided region has been enlarged is displayed at a portion of the event occurrence table image ETI corresponding to a period at which the aforementioned enlargement operation has been performed. As illustrated in FIG. 7, the user can view the enlargement operation mark EX of the event occurrence table image ETI displayed in the empty region A2 of the display section 12 to thereby recognize that the enlargement operation has been performed.

Figure 8:
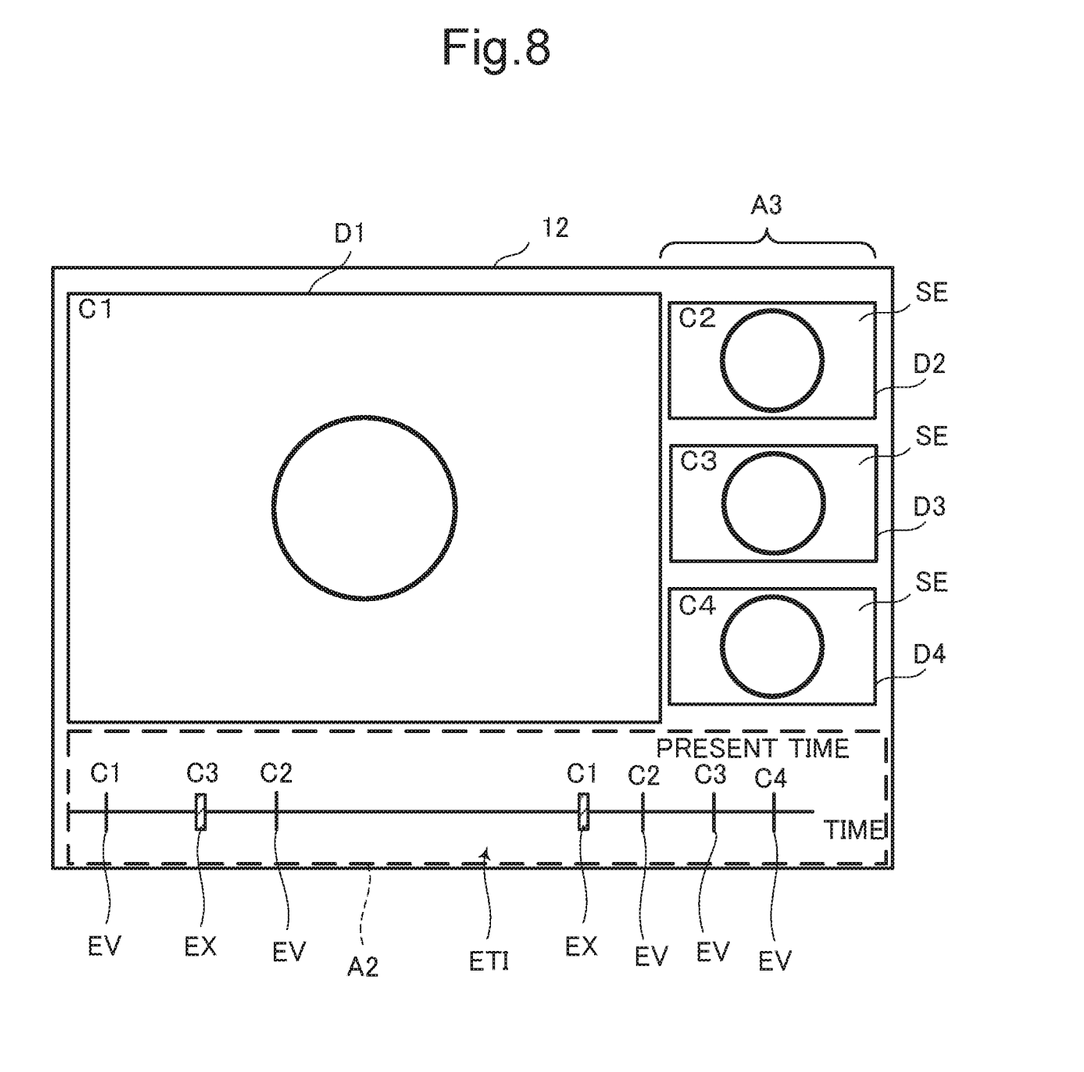
FIG. 8 is a diagram illustrating that only the event occurrence table image is displayed in the empty region illustrated in FIG. 6 in a case where the empty region is small.

On the other hand, upon the determination by the determination section 28 that the aforementioned ratio is less than the specific ratio (for example, 10%), the display control section 26 displays the event occurrence table image ETI in the empty region A2 without displaying the type display image MI, as illustrated in FIG. 8. This permits appropriate display in accordance with a size of the empty region A2 on the display screen of the display section 12 caused by the enlargement operation performed in the divided regions.

The display control section 26 displays the event EV indicated by the event occurrence table image ETI and a corresponding display image indicating correspondence with the divided region related to the aforementioned event EV. This corresponding display image refers to the "C1" to "C4" displayed at positions located above the events EV of the event occurrence table image ETI, as illustrated in FIG. 7. For example, the "C1" as the corresponding display image displayed at the position above the event EV located at a left end of the event occurrence table image ETI illustrated in FIG. 7 is an event related to the image photographed with the monitoring camera 31 (camera C1), that is, the event in the divided region D1. Upon enlarged display of the image in the one divided region D1 based on the enlargement operation of the touch panel 13 by the user, the display control section 26 displays, at the portion of the event occurrence table image ETI corresponding to the period at which the enlargement operation has been performed, the enlargement operation mark EX indicating that this divided region D1 has been enlarged.

In this embodiment, the subject to be monitored (for example, illustrated in the circle) is displayed in the divided region D1 at a past time point (three time points before a current time in FIG. 7) and the user has performed the enlargement operation at this point, and thus the enlargement operation mark EX is displayed at a portion of the event occurrence table image ETI corresponding to this past time point. Moreover, the subject to be monitored (for example, illustrated in the circle) sequentially appears at the monitoring camera 32 (the camera C2), the monitoring camera 33 (the camera C3), and the operation section 34 (the camera C4) with time passage, and thus each event EV indicating the appearance of the subject to be monitored (for example, illustrated in the circle) is displayed on the event occurrence table image ETI. Note that the enlargement operation mark EX is displayed at the portion corresponding to the period of the event (for example, the enlargement operation) located at a second place from the left end of the event occurrence table image ETI in FIG. 7. Thus, the user can recognize that the enlargement operation has also been performed at this period.

Figure 2:
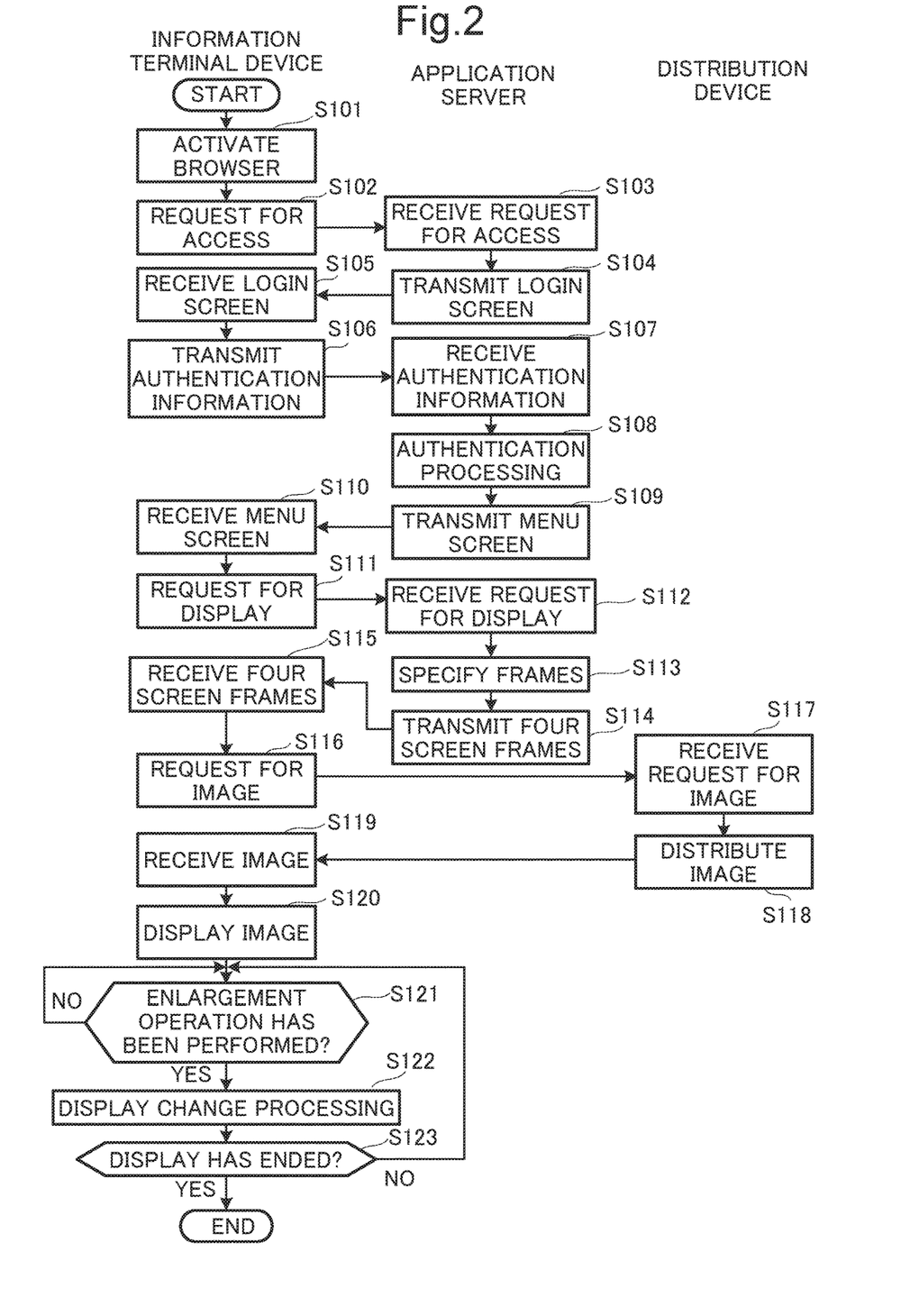
FIG. 2 is a flowchart illustrating image display processing performed in the information processing system.

Next, image display processing performed in the information processing system 100 of this embodiment, that is, processing for viewing each monitored image on the web browser in the information terminal device 10 will be described with reference to a flowchart illustrated in FIG. 2, etc.

First, based on activation operation performed by the user, the control section 21 of the information terminal device 10 activates the browser (S101), specifies a uniform resource locator (URL) of the application server 40 on the browser, and provides a request for access to this specified URL (S102). The application server 40 receives the request for access (S103) and transmits the screen information for displaying a login screen (S104).

The communication section 14 of the information terminal device 10 receives the screen information for displaying the login screen (S105). The control section 21 of the information terminal device 10 transmits authentication information composed of ID information and a password (S106). The application server 40 receives the authentication information (S107), performs authentication processing by use of this received authentication information (S108), and transmits the screen information for displaying a menu screen (operation menu) (S109).

The communication section 14 of the information terminal device 10 receives the screen information for displaying the menu screen (S110). Then the display control section 26 of the information terminal device 10 causes the display section 12 to display the menu screen. Displayed on this menu screen are, for example, operation items for selecting display of the monitored image provided from the distribution device 30.

Upon selection of the operation item for selecting the display of the monitored image provided from the distribution device 30 on the menu screen of the display section 12, the control section 21 of the information terminal device 10 provides the application server 40 with a request for displaying each of the monitored images photographed with the four monitoring cameras 31 to 34 (S111).

The application server 40 receives the request for display (S112) and specifies frames (S113). Display of plural screen display is set in initial setting (default), and thus the frames of the plural screen display is specified. More specifically, specified is the screen information displaying the divided screen (divided regions) with correspondence between a plurality of pieces of frame information for displaying the plurality of images and the IP addresses of the monitoring cameras displayed in the respective frame regions. Note that the frames (referred to as four screen frames) in this embodiment has the four divided regions obtained by quarterly and equally dividing the display screen of the display section 12 into four including the left top, the right top, the left bottom, and the right bottom. They are expressed in a structured language such as an HTML format.

The application server 40 transmits the screen information for displaying the four screen frames (S114). The communication section 14 of the information terminal device 10 receives the screen information for displaying the four screen frames (S115).

The control section 21 of the information terminal device 10 provides the four monitoring cameras 31 to 34 with a request for the images (S116). More specifically, by using the IP addresses of the four monitoring cameras 31 to 34 corresponding to the respective frames included in the screen information for displaying the four screen frames, the control section 21 provides the four monitoring cameras 31 to 34 with a request for distributing of the respective images.

The distribution device 30 receives the request for distributing the monitored images photographed with the four monitoring cameras 31 to 34 (S117). The distribution device 30 distributes each of the monitored images provided by the four monitoring cameras 31 to 34 to the information terminal device 10 (S118). The communication section 14 of the information terminal device 10 receives each of the monitored images provided from the monitoring cameras 31 to 34 (S119).

The display control section 26 of the information terminal device 10 displays, on the display screen, the on-browser images obtained by assigning the monitored images received from the four monitoring cameras 31 to 34 to the respective corresponding frames (S120). That is, displayed at the display section 12 is a four-split screen displaying each of the monitored images received from the four monitoring cameras 31 to 34, as illustrated in FIG. 4.

The control section 21 of the information terminal device 10 determines whether or not the enlargement operation (drag operation) of enlarging the one divided region has been performed (S121). In a case where the enlargement operation (drag operation) has been performed ("Yes" in S121), the control section 21 performs display change processing following the enlargement operation (S122).

Next, the display change processing performed in the information processing system 100 of this embodiment, that is, processing for viewing, on the web browser in the information terminal device 10, each of the monitored images with the other divided regions reduced following the enlargement of the one divided region included in the four divided regions will be described with reference to a flowchart illustrated in FIG. 3.

Figure 3:
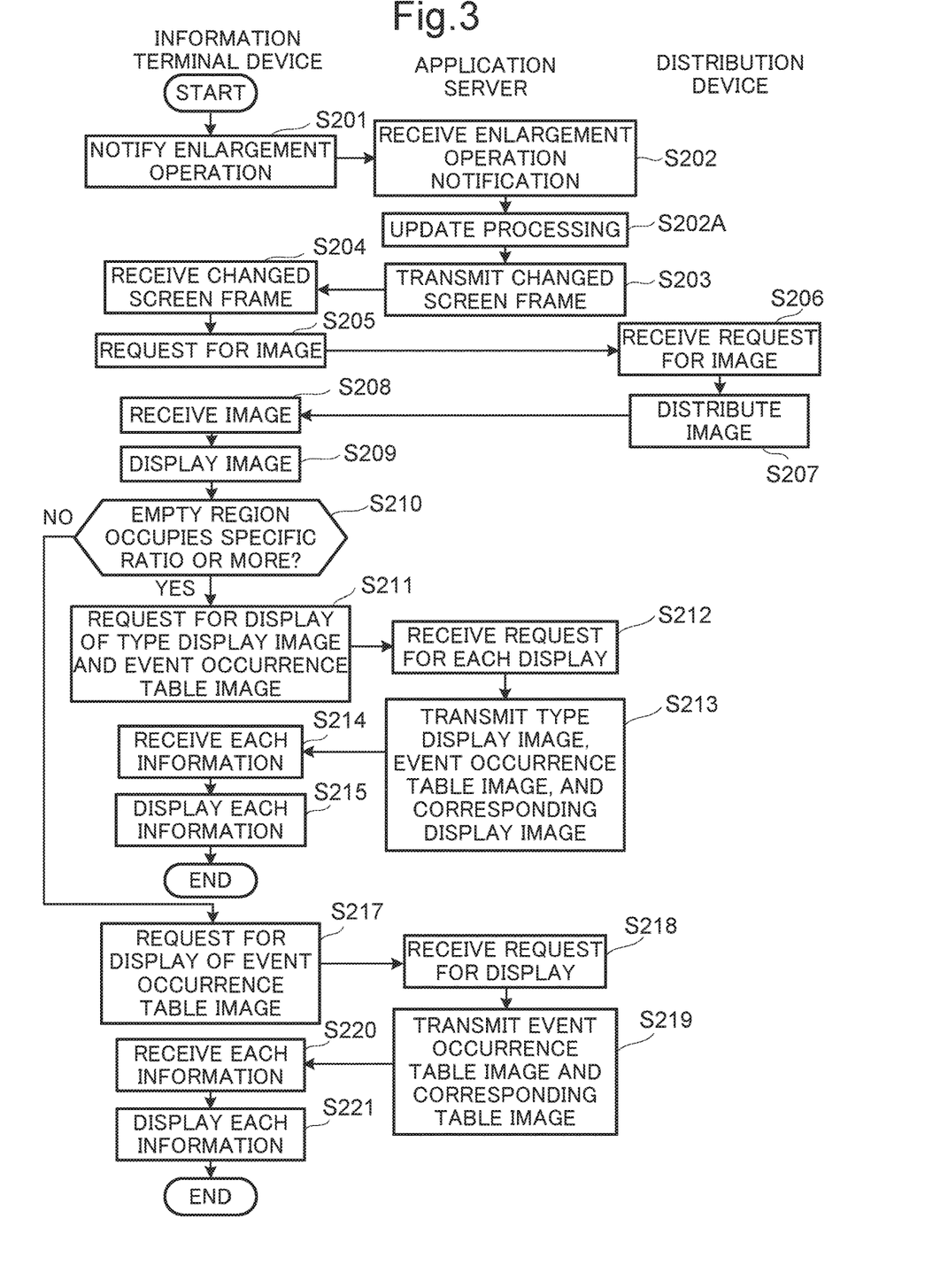
FIG. 3 is a flowchart illustrating processing for providing enlarged display of one of a plurality of divided regions on a display screen of the information terminal device.

As illustrated in FIG. 3, the control section 21 of the information terminal device 10 performs notification of the enlargement operation (drag operation) to the application server 40 (S201).

More specifically, the remaining region specification section 23 specifies the remaining region A1 on the display screen of the display section 12 excluding the one divided region (the divided region D1 in FIG. 5) enlarged through the enlargement operation (drag operation) of the touch panel 13 by the user. Then the arrangement region determination section 24 determines, in the remaining region A1 specified by the remaining region specification section 23, the arrangement region A3 for arranging all the other divided regions (the divided regions D2 to D4 of FIG. 6) other than the one enlarged divided region (the divided region D1 of FIG. 6). Then the reduced arrangement section 25 arranges, on a reduced scale in the arrangement region A3 determined by the arrangement region determination section 24, each of the other divided regions (the divided regions D2 to D4 of FIG. 6). The enlargement operation notification indicating a changed layout determined in the aforementioned manner is outputted to the application server 40.

The application server 40 receives the enlargement operation (drag operation) notification (S202), executes event occurrence table image ETI update processing of adding the enlargement operation mark EX at a portion corresponding to a period of reception of the aforementioned enlargement operation at the photographing time axis of the event occurrence table image ETI (S202A), and transmits the screen information for displaying the changed screen frame subjected to the enlargement operation (S203). The communication section 14 of the information terminal device 10 receives the screen information for displaying the changed screen frame subjected to the enlargement operation (S204).

The control section 21 of the information terminal device 10 provides the distribution device 30 with a request for the image. More specifically, the control section 21 of the information terminal device 10 provides the four monitoring cameras 31 to 34 with a request for distributing the images by use of the IP addresses of the four monitoring cameras 31 to 34 corresponding to the respective frames included in the screen information for displaying one changed screen frame (S205).

The four monitoring cameras 31 to 34 receive the request for distributing the images (S206) and distribute the images (S207). The communication section 14 of the information terminal device 10 receives the images from the four monitoring cameras 31 to 34 (S208).

The display control section 26 of the information terminal device 10 assigns the images received from the four monitoring cameras 31 to 34 to the changed screen frame subjected to the enlargement operation and displays, on an enlarged scale in the one enlarged divided region (the divided region D1 of FIG. 7), the image of this one divided region (that is, the image of the subject to be monitored (for example, illustrated in the circle)), and upon judgment by the image judgment section 27 that the subject to be monitored (for example, illustrated in the circle) is included in the images of the other divided regions (the divided regions D2 to D4 of FIG. 7) arranged on a reduced scale by the reduced arrangement section 25, the display control section 26 displays, on the display screen, the changed on-browser image on which the image of the specific portion SE including the subject to be monitored (for example, illustrated in the circle) is displayed on an enlarged scale (S209).

As illustrated in FIG. 7, the image of the monitoring camera 31 (that is, the subject to be monitored (for example, illustrated in the circle)) is displayed on an enlarged scale in the one divided region D1 enlarged on the display screen of the display section 12, and the image of the specific portion SE of the monitored images of the monitoring cameras 32 to 34 (that is, the subject to be monitored (for example, illustrated in the circle)) is displayed on an enlarged scale in the other divided regions D2 to D4 reduced on the display screen of the display section 12 upon every judgment by the image judgment section 27 that the subject is included in the images of the other divided regions D2 to D4.

The determination section 28 of the information terminal device 10 determines whether or not a ratio of the empty region A2, obtained by excluding the arrangement region A3 determined by the arrangement region determination section 24 from the remaining region A1 specified by the remaining region specification section 23, occupying the display screen is equal to or greater than the specific ratio (for example, 10%) (S210). Upon determination by the determination section 28 that the aforementioned ratio is equal to or greater than the specific ratio (for example, 10%) ("Yes" in S210), the control section 21 of the information terminal device 10 provides the application server 40 with a request for displaying the type display image MI and the event occurrence table image ETI (S211). The application server 40 receives the request for displaying the type display image MI and the event occurrence table image ETI (S211), and transmits the type display image MI, the event occurrence table image ETI, and the corresponding display image to the information terminal device 10 (S213). The communication section 14 of the information terminal device 10 receives the type display image MI, the event occurrence table image ETI, and the correspondence display image (S214). As illustrated in FIG. 7, the display control section 26 of the information terminal device 10 displays, in the empty region A2 on the display screen of the display section 12, the type display image MI related to the images of the four divided regions, the event occurrence table image ETI indicating event EV occurrence timing, and the corresponding display image (S215), ending the present processing.

Specifically, upon the determination by the determination section 28 that the aforementioned ratio is equal to or greater than the specific ratio (for example, 10%) ("Yes" in S210), the display control section 26 displays, in the empty region A2, the type display image MI related to the images of the plurality of divided regions and the event occurrence table image ETI indicating the event EV occurrence timing, as illustrated in FIG. 7.

Upon determination by the determination section 28 that the ratio of the empty region A2 occupying the display screen is less than the specific ratio (for example, 10%) ("No" in S210), the control section 21 of the information terminal device 10 provides the application server 40 with a request for displaying only the event occurrence table image ETI (S217). The application server 40 receives the request for displaying the event occurrence table image ETI (S218) and transmits the event occurrence table image ETI and the corresponding display image to the information terminal device 10 (S219). The communication section 14 of the information terminal device 10 receives the event occurrence table image ETI and the corresponding display image (S220). As illustrated in FIG. 8, the display control section 26 of the information terminal device 10 displays the event occurrence table image ETI indicating the event EV occurrence timing and the corresponding display image in the empty region A2 on the display screen of the display section 12 (S221), ending the present processing.

Specifically, upon the determination by the determination section 28 that the aforementioned ratio is less than the specific ratio (for example, 10%) ("No" in S210), the display control section 26 displays the event occurrence table image ETI in the empty region A2 without displaying the type display image MI, as illustrated in FIG. 8.

Returning to FIG. 2, after the display change processing (S122) following the enlargement operation, the control section 21 of the information terminal device 10 determines whether or not ending of the display of monitoring camera viewing has been received (S123). Upon determination that the display has not yet ended ("No" in S123), the control section 21 returns to S121 and upon determination that the display has ended ("Yes" in S123), the control section 21 ends the present processing.

In this embodiment as described above, in a case where the respective monitored images of the four monitoring cameras 31 to 34 are respectively displayed in the divided regions D1 to D4 obtained by quarterly dividing the display screen of the display section 12, upon the enlargement operation of the divided region D1 of the display screen on the touch panel 13, the display control section 26 displays, on an enlarged scale in the enlarged divided region D1, the image of the one divided region (the monitored image of the monitoring camera 31) and also displays, on an enlarged scale in the divided regions D2 to D4 arranged on a reduced scale by the reduced arrangement section 25, the images of the specific portions SE of the other divided regions D2 to D4 (the monitored images of the specific portions SE in the monitoring cameras 32 to 34), as illustrated in FIG. 7. This therefore can suppress difficulties in viewing the image display of the other reduced divided regions D2 to D4 even in a case where the other divided regions D2 to D4 are reduced following the enlargement of the one divided region D1 included in the plurality of (four) divided regions D1 to D4 of the display screen.

In a typical image processing system described in the background art above, upon user's enlargement operation performed on the portable terminal with four-screen display formed of the main screen and the three sub-screens, the entire display screen of the main screen is displayed on an enlarged scale, so that the monitored image on the main screen can more easily be viewed while the three sub-screens are erased. Thus, there arises a problem that the user cannot view the monitored images of the sub-screens. If an upper limit for the enlargement of the main screen is defined to remain the three sub-screens, the three sub-screens are reduced following the enlargement of the main screen in any way, thus inevitably making it difficult to view the monitored images of the sub-screens as a result of the reduction.

On the contrary, it is possible in this embodiment to suppress the difficulties in viewing the image display of the other reduced divided regions even in a case where the other divided regions are reduced following the enlargement of the one divided region included in the plurality of divided regions of the display screen.

The screen information for displaying the four screen frames or the changed screen frame, the type display image MI, the event occurrence table image ETI, and the corresponding display image are received from the application server 40, but the information terminal device 10 may determine the aforementioned screen information and also possess or acquire from the distribution device 30 the type display image MI, the event occurrence table image ETI, and the corresponding display image to thereby perform only login and authentication on the application server 40. This permits a series of screen displays illustrated in FIGS. 4 to 8 only with the information terminal device 10.

Modified Example

The event EV is detected on the information terminal device 10 side in the embodiment described above. Specifically, the image judgment section 27 judges that the subject to be monitored is included in the images of the divided regions D2 to D4, and the display control section 26 displays the event EV at a portion of the event occurrence table image ETI corresponding to a time point at which the aforementioned judgment has been performed. On the contrary, as in the modified example illustrated in FIG. 9, the event EV may be detected on the application server 40 side.

Figure 9:
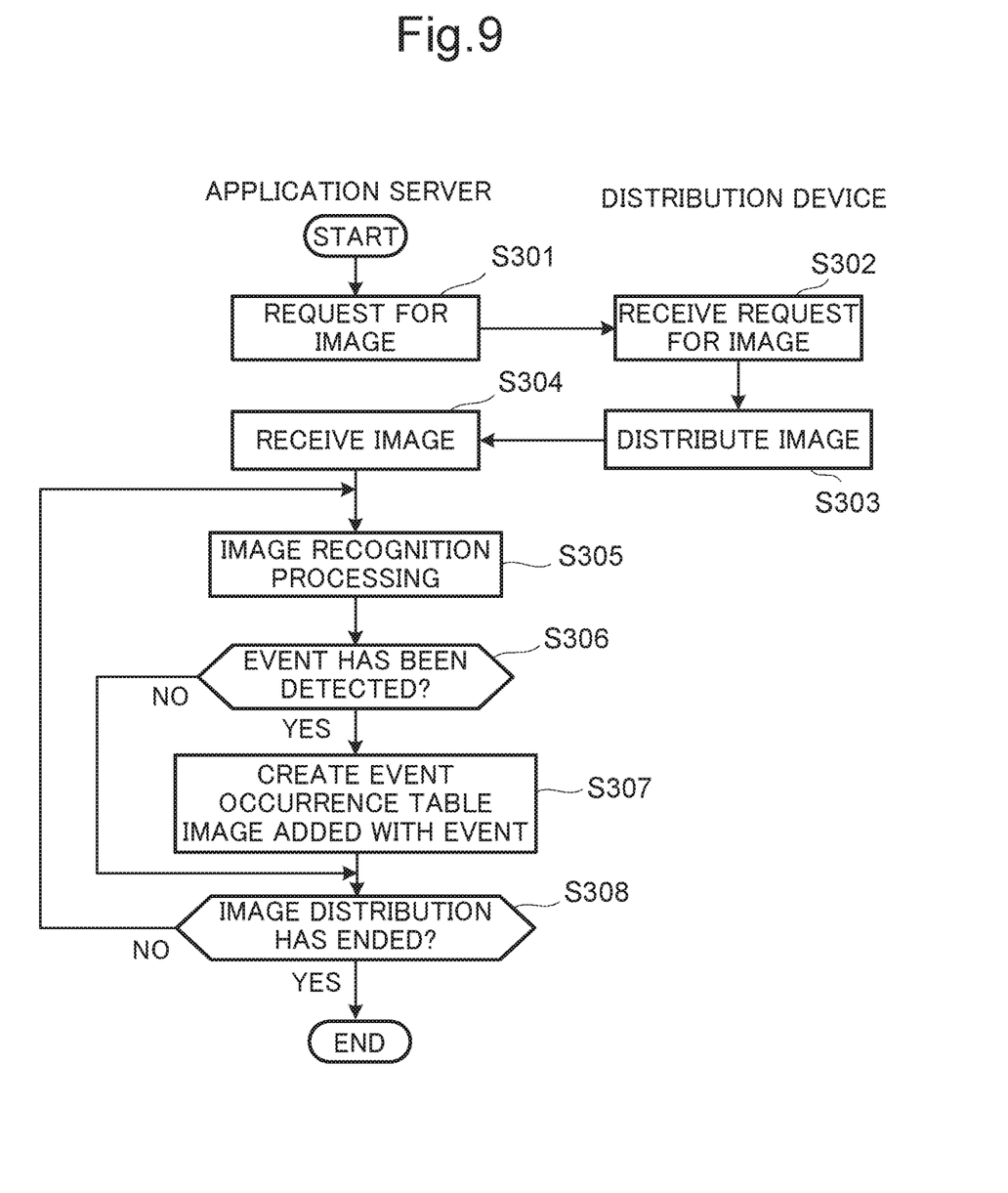
FIG. 9 is a flowchart illustrating event detection processing performed in an application server of a modified example.

In the modified example, the application server 40 executes event detection processing illustrated in FIG. 9. It is assumed that the application server 40 receives enlargement operation notification (notification of enlargement operation performed on the divided region D1 as is the case with the embodiment described above) as illustrated in S202 of FIG. 3.

The application server 40 provides the four monitoring cameras 31 to 34 with a request for the images (S301). The distribution device 30 receives the request for the images from the application server 40 (S302). The distribution device 30 distributes the respective monitored images provided by the four monitoring cameras 31 to 34 to the application server 40 (S303).

The application server 40 receives the respective monitored images from the four monitoring cameras 31 to 34 (S304). The application server 40 performs image recognition processing on the respective monitored images received from the four monitoring cameras 31 to 34 (S305). More specifically, the image judgment section included in the application server 40 performs the image recognition processing on the enlarged monitored image of the monitoring camera 31 and specifies, as the subject to be monitored, the subject included in the image of this enlarged monitored image. Next, the image judgment section included in the application server 40 judges, for each of the monitoring cameras 32 to 34, whether or not the subject to be monitored is included in each of the monitored images provided from the other monitoring cameras 32 to 34. That is, the application server 40 performs, for each of the monitored images provided from the other monitoring cameras 32 to 34, event detection of the event EV including the subject to be monitored (S306).

Upon judgment that the event detection has been performed ("Yes" in S306), the application server 40 creates the event occurrence table image ETI added with the event EV on which the event detection has been performed (S307). The event occurrence table image ETI created here is transmitted to the information terminal device 10 in the aforementioned S213 and S219 illustrated in FIG. 3. The user can view each of the events EV of the event occurrence table image ETI displayed in the empty region A2 on the display screen of the display section 12 to thereby recognize that the event EV has occurred, as illustrated in FIGS. 7 and 8. After this S307 or upon judgment that no event detection has been performed ("No" in S306), the application server 40 determines whether or not the image distribution has ended (S308), and returns to S305 in a case where the image distribution has not ended ("No" in S308). On the other hand, in a case where the image distribution has ended ("Yes" in S308), the application server 40 ends the present processing.

Note that the aforementioned events EV may include: in addition to the appearance of the aforementioned subject to be monitored (for example, illustrated in the circle), appearance, exit, takeaway, and leaving of a target such as an object or a product. For example, detection of the leaving of the target can be achieved through image recognition that the image of the target has disappeared from the monitored image. The detection of the takeaway of the target can be achieved through image recognition that the image of the target has appeared in the monitored image. Further, the aforementioned events EV may include: for example, entrance, leaving, etc. of the subject, a change in a detection state of movement of the subject (for example, detection of suspicious movement through automatic tracking of the subject as a result of performing, for example, face recognition processing on the monitored image photographed by the monitoring camera), activation and stopping of the image processing system 100, start and stopping of recording, and a change in detection by an external sensor (for example, detection of a toner-cover open state in a state in which no error is occurring).

For the aforementioned event EV, instead of executing the image recognition processing on the monitored image by the information terminal device 10 or the application server 40, the distribution device 30 may execute the image recognition processing on the monitored image to thereby detect the aforementioned event, information associating the image distribution with the event information may be distributed from the distribution device 30 to the application server 40, and the application server 40 may recognize the event occurrence in the image distribution based on the received event information.

The embodiment above and the modified example have been described, referring to, as an example, the monitored images photographed by the monitoring cameras 31 to 34, but images are not limited to such monitored images and any image other than those for monitoring purposes, for example, TV images such as those from a sport or a documentary may be used.

Note that the method of display by the information terminal device 10 described in the embodiment above can be provided as a program. This program is recorded into a computer-readable non-transitory recording medium, for example, a hard disc, a CD-ROM, a DVD-ROM, or a semiconductor memory. In this case, the computer-readable non-transitory recording medium storing the aforementioned program forms one embodiment of this disclosure.

While the present disclosure has been described in detail with reference to the embodiments thereof, it would be apparent to those skilled in the art the various changes and modifications may be made therein within the scope defined by the appended claims.

What is claimed is:

1. An information terminal device comprising:
    a display section displaying an image in each of a plurality of divided regions obtained by plurally dividing a display screen;
    an operation section that has a touch panel and receives, from a user, enlargement operation of enlarging one of the plurality of divided regions on the display screen; and
    a control unit including a processor and functioning, when the processor executes a control program, as:
        a remaining region specification section specifying a remaining region on the display screen excluding one divided region enlarged through the enlargement operation of the operation section by the user;
        an arrangement region determination section determining an arrangement region for arranging all the divided regions other than the one enlarged divided region in the remaining region specified by the remaining region specification section;
        a reduced arrangement section arranging each of all the divided regions other than the one enlarged divided region, on a reduced scale in the arrangement region determined by the arrangement region determination section;
        a display control section displaying, on an enlarged scale, an image of the one enlarged divided region, in the one enlarged divided region and also displaying, on other enlarged scale within the other divided regions arranged on the reduced scale by the reduced arrangement section, an image of a specific portion of the other divided regions; and
        an image judgment section judging, through image recognition of the images displayed in the other divided regions, whether or not a subject or a target is included in images, wherein upon judgment by the image judgment section that the subject is included in the images, the display control section displays a face portion, including a face of the subject subjected to face recognition performed by the image judgment section, as the specific portion on the other enlarged scale within the other divided regions, and upon judgment by the image judgment section that a predefined subject is included in the images, the display control section displays an object portion, including the subject recognized by the image judgment section, as the specific portion on the other enlarged scale within the other divided regions, and the information terminal device, further comprising a storage storing collation source registration data, wherein the image judgment section extracts face authentication information of the subject based on image information displayed in the one enlarged divided region, stores the extracted face authentication information of the subject as the collation source registration data into the storage, judges, for each of the other divided regions, whether or not the face authentication information of the subject extracted based on the image information for each of the other divided regions matches the collation source registration data of the storage, and when the matching is achieved, judges that the subject is included in the images.

2. An information terminal device comprising:

a display section displaying an image in each of a plurality of divided regions obtained by plurally dividing a display screen;

an operation section that has a touch panel and receives, from a user, enlargement operation of enlarging one of the plurality of divided regions on the display screen; and a control unit including a processor and functioning, when the processor executes a control program, as:

a remaining region specification section specifying a remaining region on the display screen excluding one divided region enlarged through the enlargement operation of the operation section by the user;

an arrangement region determination section determining an arrangement region for arranging all the divided regions other than the one enlarged divided region in the remaining region specified by the remaining region specification section;

a reduced arrangement section arranging each of all the divided regions other than the one enlarged divided region, on a reduced scale in the arrangement region determined by the arrangement region determination section;

a display control section displaying, on an enlarged scale, an image of the one enlarged divided region, in the one enlarged divided region and also displaying, on other enlarged scale within the other divided regions arranged on the reduced scale by the reduced arrangement section, an image of a specific portion of the other divided regions; and     a determination section determining whether or not a ratio of an empty region, obtained by excluding the arrangement region determined by the arrangement region determination section from the remaining region specified by the remaining region specification section, occupying the display screen is equal to or greater than a predefined specific ratio, wherein upon determination by the determination section that the ratio is equal to or greater than the predefined ratio, the display control section displays, in the empty region, a type display image indicating a type of the images of the plurality of divided regions and an event occurrence table image indicating a period at which an event has occurred with respect to a time axis indicating predefined time, and upon determination by the determination section that the ratio is less than the predefined ratio, the display control section displays, in the empty region, the event occurrence table image without displaying the type display image.

3. The information terminal device according to claim 2, wherein the display control section displays the event indicated by the event occurrence table image and a corresponding display image indicating correspondence with the plurality of divided regions related to the event.

4. The information terminal device according to claim 2, wherein in a case where the image has been displayed through the enlargement operation of the one of the plurality divided regions based on the enlargement operation of the operation section by the user, the display control section displays, at a position of the event occurrence table image corresponding to a period at which the enlargement operation has been performed, an enlargement operation mark indicating that the one divided region has been enlarged.

\* \* \* \* \*